(12) United States Patent
Teich et al.

(10) Patent No.: US 11,741,254 B2
(45) Date of Patent: Aug. 29, 2023

(54) PRIVACY CENTRIC DATA SECURITY IN A CLOUD ENVIRONMENT

(71) Applicant: International Business Machines Corporation, Armonk, NY (US)

(72) Inventors: Torsten Teich, Stuttgart (DE); Andrew Low, Ontario (CA)

(73) Assignee: International Business Machines Corporation, Armonk, NY (US)

(*) Notice: Subject to any disclaimer, the term of this patent is extended or adjusted under 35 U.S.C. 154(b) by 399 days.

(21) Appl. No.: 16/843,816

(22) Filed: Apr. 8, 2020

(65) Prior Publication Data

US 2021/0319133 A1    Oct. 14, 2021

(51) Int. Cl.
*G06F 21/00*    (2013.01)
*G06F 21/62*    (2013.01)
*H04L 67/01*    (2022.01)

(52) U.S. Cl.
CPC .......... *G06F 21/6245* (2013.01); *H04L 67/01* (2022.05)

(58) Field of Classification Search
CPC .... G06F 21/6245; G06F 21/10; G06F 21/602; G06F 21/64; G06F 21/645; G06F 2221/2141; H04L 67/42; H04L 63/0245; H04L 63/0407; H04L 63/101; H04L 63/08; H04L 63/04; H04L 63/0227; H04L 63/10; H04L 63/0428; H04L 63/0442; H04L 9/3213; H04L 9/3228; H04L 9/50; G16H 10/60; G16H 40/20; H04W 12/08; H04W 12/06; G06Q 50/265
See application file for complete search history.

(56) References Cited

U.S. PATENT DOCUMENTS 10,963,589 B1 *   3/2021   Fakhraie ................ H04L 63/20
2014/0007189 A1   1/2014   Huynh et al.
2015/0074401 A1   3/2015   D'Souza et al.
(Continued)

FOREIGN PATENT DOCUMENTS

CN      103002040 A    3/2013
CN      103973715 A    8/2014
(Continued)

OTHER PUBLICATIONS

Elliot Williams, "Can Solid Save the Internet," Apr. 4, 2020, Hackaday, 18 pages.
(Continued)

*Primary Examiner* — Dustin Nguyen
*Assistant Examiner* — Hao H Nguyen
(74) *Attorney, Agent, or Firm* — Patterson + Sheridan, LLP

(57) ABSTRACT

Techniques for privacy centric data security. A request to permit a data processor to access private data associated with a user is received at a cloud data privacy service. The request includes a request for a data access block relating to the private data, and a data filter describing one or more access parameters. The cloud privacy data service generates the first data access block, based on the private data and the data filter. The first data access block is transmitted from the cloud privacy service to a user device, which is configured to transmit the first data access block to the first data processor. The cloud data privacy service receives a request for the private data that includes the first data access block. The cloud data privacy service determines that the first data access block is valid, and grants the first data processor access to the private data.

19 Claims, 19 Drawing Sheets

(56) References Cited

U.S. PATENT DOCUMENTS

| | | |
|---|---|---|
| 2015/0169890 A1 | 6/2015 | D'Souza et al. |
| 2016/0117448 A1* | 4/2016 | Van De Craen ....... G16H 10/60 |
| | | 705/3 |
| 2016/0173453 A1 | 6/2016 | Burch et al. |
| 2018/0005228 A1* | 1/2018 | Anderson .............. G06Q 20/12 |
| 2019/0286840 A1* | 9/2019 | Duca ..................... G06F 21/604 |
| 2020/0366660 A1* | 11/2020 | Vasireddy ........... H04L 63/0807 |
| 2021/0067324 A1* | 3/2021 | Valente ................. G06F 21/602 |
| 2021/0104304 A1* | 4/2021 | Davidovics ............. H04L 67/10 |
| 2021/0365584 A1* | 11/2021 | Harris ................. G06F 16/2379 |
| 2022/0027499 A1* | 1/2022 | Watkins .................. H04L 63/10 |

FOREIGN PATENT DOCUMENTS

| | | |
|---|---|---|
| CN | 110086818 A | 8/2019 |
| WO | 2019086553 A1 | 5/2019 |

OTHER PUBLICATIONS

Lewin Day, "Solid Promise A New Approach to How the Web Works," Hackaday, Mar. 30, 2020, 41 pages.
Inrupt, Tim Berners—Lee's Solid, and Me—Schneier on Security [Accessed Apr. 7, 2020].
PCT, International Search Report and Written Opinion of The International Searching Authority for Application PCT/IB2021/052154 dated Jun. 18, 2021.

* cited by examiner

| ITEM INDEX 462 | ITEM LABEL 464 | ITEM KEY 466 | VALUE 468 | DEFAULT FILTER 470 |
|---|---|---|---|---|
| I-1 | NAME | A1 | ⋮ | READ ALWAYS |
| I-2 | SOCIAL SECURITY | B1A1 | ⋮ | APPROVE BY ME AND READ ONCE |
| I-3 | E-MAIL ADDRESS | B2A1 | ⋮ | READ ALWAYS |
| I-4 | BIRTH DATE | B3A1 | ⋮ | APPROVE BY ME AND READ ONCE |
| I-5 | BANK ACCOUNTS | B4A1 | ⋮ | APPROVE BY ME AND READ ONCE |
| I-6 | CREDIT CARDS | B5A1 | ⋮ | APPROVE BY ME AND READ ONCE |
| I-7 | INSURANCE POLICIES | B6A1 | | APPROVE BY ME |
| I-8 | HOME ADDRESS | C1B2A1 | ⋮ | APPROVE BY ME AND READ ONCE |
| I-9 | HEALTH REPORTS | C2B3A1 | ⋮ | APPROVE BY ME AND READ ONCE |
| I-10 | CARD 1 | C4B5A1 | ⋮ | APPROVE BY ME AND READ ONCE |
| I-11 | CARD 2 | C5B5A1 | ⋮ | APPROVE BY ME AND READ ONCE |
| I-12 | WORK ADDRESS | D1C1B2A1 | ⋮ | APPROVE BY ME AND READ ONCE |
| I-13 | GENERAL HEALTH DATA | D2C2B3A1 | ⋮ | APPROVE BY ME |
| I-14 | CVV1 | D3C4B5A1 | ⋮ | APPROVE BY ME AND READ ONCE |

| ITEM INDEX 462 | ITEM LABEL 464 | ITEM KEY 466 | VALUE 468 | DEFAULT FILTER 470 |
|---|---|---|---|---|
| I-15 | CVV2 | D4C5B5A1 | ... | APPROVE BY ME AND READ ONCE |
| I-16 | DENTAL | E1D2C2B3A1 | ... | READ AND UPDATE BY<DENTIST> |
| I-17 | ALLERGY | E2D2C2B3A1 | ... | READ AND UPDATE BY<ALLERGIST> |
| ... | | | ... | ... |

| FILTER IDENTIFIER 552 | FILTER TERM 554 | PROGRAM MODULE 556 |
|---|---|---|
| F-1 | READ ALWAYS | `{`<br>`  if(access==read) {`<br>`    return true;`<br>`  }`<br>`  return false;`<br>`}` |
| F-2 | APPROVE BY ME | `{`<br>`  String response=requestApproval(<Key>);`<br>`  if (response=="approve"){`<br>`    return true;`<br>`  }`<br>`  return false;`<br>`}` |
| F-3 | APPROVE BY ME AND READ ONCE | `{`<br>`  String response=requestApproval(<Key>);`<br>`  if (response=="approve") then`<br>`    if ((count=getAccessCount())==0){`<br>`      setAccessCount(count+1)`<br>`      return true;`<br>`    }`<br>`  return false;`<br>`}` |

| FILTER IDENTIFIER 552 | FILTER TERM 554 | PROGRAM MODULE 556 |
|---|---|---|
| F-4 | READ AND UPDATE BY<Data_Processor> | {<br>if(access==read) \|\| (acess==update){<br>if (getrequester() == (<Key>)<br>return true;<br>}<br>return false;<br>} |
| ... | ... | ... |

*FIG. 5C*

| TYPE 602 | CONTENT 604 |
|---|---|
| DATA ACCESS BLOCK | Signature l block1 [Block [...] ] |
| BLOCK | Date: Item [, item [...] ] : Filter [filter [...] ] |
| DATE | TIMESTAMP FOR CREATION OF THE BLOCK |
| ITEM | IDENTIFIER OF THE PRIVACY DATA ITEM IN DATA REPOSITORY |
| FILTER | FILTER TERM, OR IDENTIFIER OF THE FILTER TERM IN THE FILTER REPOSITORY |
| SIGNATURE | SIGNATURE OVER THE LIST OF BLOCKS |

*FIG. 6A*

| UNIQUE IDENTIFIER 652 | REQUESTER 654 | DATA ACCESS BLOCK 656 | BLOCK USAGE 658 |
|---|---|---|---|
| AB12340001 | FAMILY DOCTOR | <signature>I2019/01/01:A1,B2A1,B3A1,D2C2B3A1:default | 1: 2019/03/03 11:30 |
| AB12340002 | DENTIST | <signature>I2019/01/01:A1,B2A1,B3A1,E1D2C2B3A1:default | 0 |
| AB12340005 | WEBSHOP1 | <signature>I2019/01/01:A1,B2A1,C4B5A1: read until 2019/06/06 | 1: 2019/01/04 09:44 |
| AB12340005 | WEBSHOP1 | <signature>I2019/01/01:A1,B2A1,C4B5A1: read until 2019/06/06 | 2: 2019/02/23 13:56 |

*FIG. 6B*

PRIVACY CENTRIC DATA SECURITY IN A CLOUD ENVIRONMENT

BACKGROUND

The present invention relates to computer security, and more specifically, to privacy centric data security in a cloud environment.

SUMMARY

Embodiments include a method. The method includes receiving, at a cloud data privacy service, a request from a user device to permit a first data processor to access private data associated with the user. The request includes a request for a first data access block relating to the private data, and a data filter describing one or more access parameters relating to the first data processor and the private data. The method further includes generating the first data access block, at the cloud data privacy service, based on the private data and the data filter. The method further includes transmitting the first data access block from the cloud privacy service to the user device. The user device is configured to transmit the first data access block to the first data processor. The method further includes receiving, at the cloud data privacy service, a request from the first data processor for the private data, the request including the first data access block. The method further includes determining, at the cloud data privacy service, that the first data access block received from first data processor is valid, and in response granting the first data processor at least partial access to the private data.

Embodiments further include a system. The system includes a processor, and a memory storing a program, which, when executed on the processor, performs an operation. The operation includes receiving, at a cloud data privacy service, a request from a user device to permit a first data processor to access private data associated with the user. The request includes a request for a first data access block relating to the private data, and a data filter describing one or more access parameters relating to the first data processor and the private data. The operation further includes generating the first data access block, at the cloud data privacy service, based on the private data and the data filter. The operation further includes transmitting the first data access block from the cloud privacy service to the user device. The user device is configured to transmit the first data access block to the first data processor. The operation further includes receiving, at the cloud data privacy service, a request from the first data processor for the private data, the request including the first data access block. The operation further includes determining, at the cloud data privacy service, that the first data access block received from first data processor is valid, and in response granting the first data processor at least partial access to the private data.

Embodiments further include a non-transitory computer program product, the computer program product including a computer-readable storage medium having computer-readable program code embodied therewith, the computer-readable program code executable by one or more computer processors to perform an operation. The operation includes receiving, at a cloud data privacy service, a request from a user device to permit a first data processor to access private data associated with the user. The request includes a request for a first data access block relating to the private data, and a data filter describing one or more access parameters relating to the first data processor and the private data. The operation further includes generating the first data access block, at the cloud data privacy service, based on the private data and the data filter. The operation further includes transmitting the first data access block from the cloud privacy service to the user device. The user device is configured to transmit the first data access block to the first data processor. The operation further includes receiving, at the cloud data privacy service, a request from the first data processor for the private data, the request including the first data access block. The operation further includes determining, at the cloud data privacy service, that the first data access block received from first data processor is valid, and in response granting the first data processor at least partial access to the private data.

BRIEF DESCRIPTION OF THE SEVERAL VIEWS OF THE DRAWINGS

FIGS. 4A-C illustrate data structures for privacy centric data security in a cloud environment, according to at least one embodiment.

FIGS. 5A-C illustrate privacy filters for privacy centric data security in a cloud environment, according to at least one embodiment.

FIGS. 6A-B illustrate data access block structures for privacy centric data security in a cloud environment, according to at least one embodiment.

DETAILED DESCRIPTION

Figure 1:
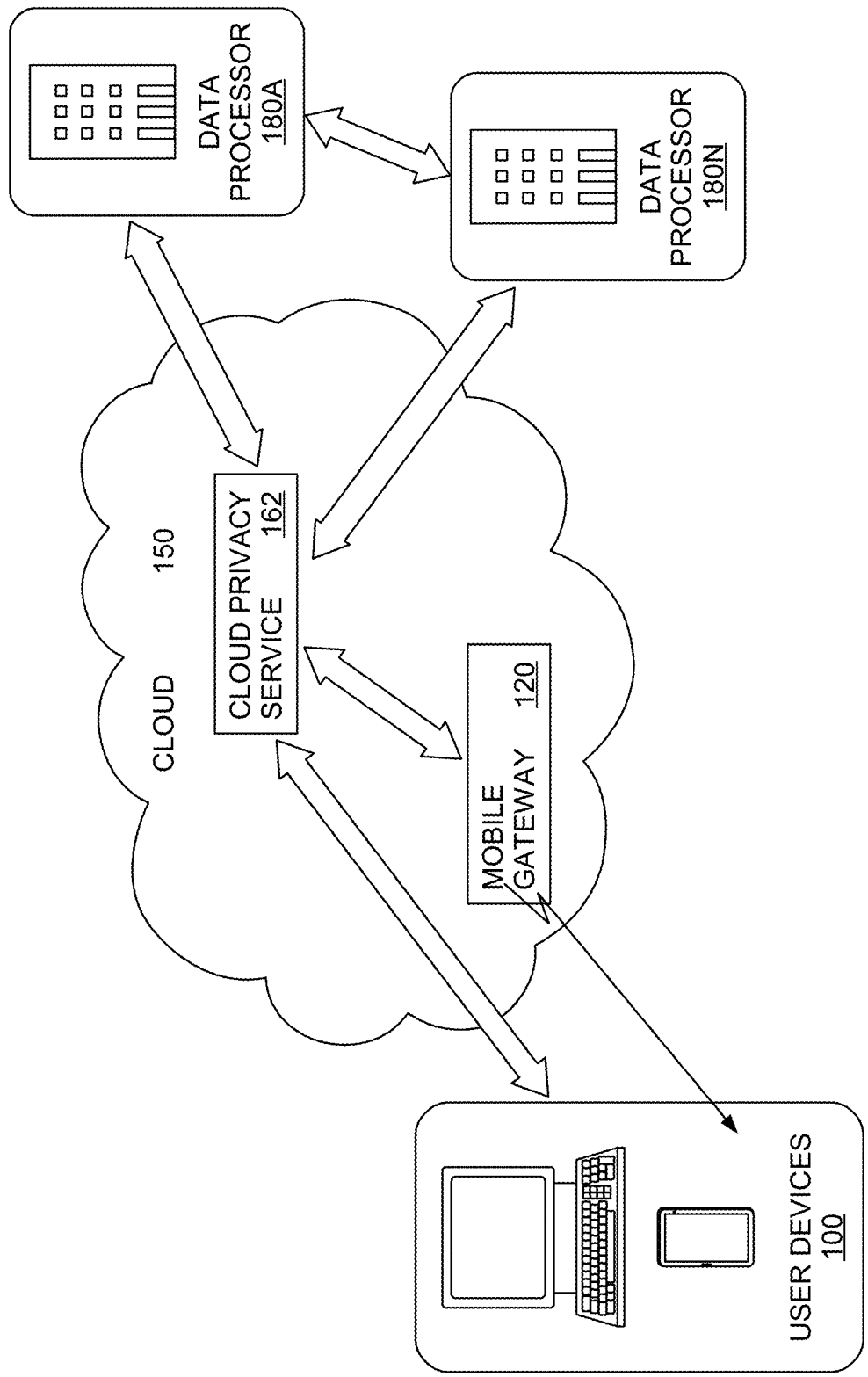
FIG. 1 illustrates a system for privacy centric data security in a cloud environment, according to at least one embodiment.

In the modern connected world, data privacy is becoming increasingly important. In an embodiment, data privacy can be improved through a privacy-centric system, in which personal data is stored where the owner decides, and access to the data is under real-time control of the owner at any time. To facilitate this, a user can own a virtual data safe to manage the user's personal data and the scope of access allowed for the data. In an embodiment, this can be a secure service in the cloud, operated by a trusted service provider, and installed in the region chosen by the user. The exchange of information is negotiated through this virtual data safe. Further, unlike a physically secure safe (which can be opened by a key or code, but is either open or locked) the virtual data safe may unlock partial access to its content.

In an embodiment, access to read the user's private data is implemented by a secure access token. Each data requestor (e.g., a user's medical provider, financial institution, social media service, etc.) is given a token allowing the requestor to read the user data. The user, further, can govern precisely which data each requestor is allowed to access, for example providing a medical provider with access to a relevant portion of the user's medical data and a financial provider with access to a relevant portion of the user's financial data. A user can withdraw the token, revoking access to the requestor. In an embodiment, the requestor can access the data (stored in the virtual data safe) through a web service, or suitable API (e.g., a RESTful API). Further, the user can choose to be notified whenever his or her data is accessed. Notification can be configured per item, based on the requestor's token.

In an embodiment, service providers who want to store data about the user are required to store the data in the user's virtual data safe. Trusted authorities may request access to the data, under control of the user. The user can be informed in real time about the access request and can approve or deny (via, for example, push notification or SMS to her mobile device). Further, to avoid overwhelming the user with notifications, the user can decide how often or at which time or event she receives the next notification for the specific requestor or data element. Further, in case the user is not able to react in time to approve or deny the access, temporary access rules can be applied for data elements for which the user has provided a pre-approval for the temporary access.

In an embodiment, a user can further choose to allow broader access to data that has been anonymized. This can allow a user to participate in public polls but limit disclosure of specifics within his private data. For example, specific information about the person can be anonymized so that the requestor receives only limited, or aggregate, results. In an embodiment, the provider of the virtual data safe acts as a trusted party with which the user has engaged into a trust relationship based on the service contract the two parties have engaged into.

For example, a user may also choose to tag specific data elements with a type of use such as "temporary read only," as opposed to "own/copy," in which case the requestor of a data element may process the data temporarily but not store it permanently. The decision of the user can be implemented by means of a privacy token which the user obtains in real-time from the trusted service provider. The user (holder of the privacy token) might forward this token to a third party which might in turn approach the trusted service provider and present the privacy token. The trusted service provider can then hand over requested data associated with the privacy token.

Further, one privacy token can be used to generate a secondary privacy token (with permission from the user), allowing another entity to access the same, or a subset, of the user's private information. In an embodiment, all involved parties adhere to policies which are bound to the data under the control of the data owner. All accesses, transactions and interactions are logged on the virtual data safe.

FIG. 1 illustrates a system for privacy centric data security in a cloud environment, according to at least one embodiment. One or more user devices 100 are communicatively coupled with a cloud system 150. In an embodiment, the user devices 100 can include any suitable user device, including a laptop computer, a desktop computer, a smartphone, a tablet, etc. The cloud system 150 can be any suitable cloud system (e.g., a public cloud, a private cloud, a hybrid cloud, etc.). The cloud system 150 is described in more detail below with regard to FIGS. 9 and 10. While one or more disclosed embodiments describe a cloud-based system as one example, any suitable system, including a non-cloud-based system can be used.

The user devices 100 can communicate with the cloud system 150 using any suitable communication technique, including a WiFi connection, a cellular connection, a wired connection, etc. In an embodiment, one or more of the user devices 100 communicate with the cloud system 150 using a cellular connection via the mobile gateway 120. Further, the user devices 100 can communicate with the cloud system 150 using any suitable communication network, including a local area network, a wide area network, the Internet, etc.

One or more data processors 180A-N are further communicatively coupled with the cloud system 150 and, in an embodiment, with each other. As described further below, the data processors 180A-N can be systems that use private data associated with the users of the user devices 100. For example, the data processors 180A-N can include social networks, financial institutions, medical institutions, businesses, educational institutions, electronic games, etc. The data processors 180A-N can communicate with the cloud system 150 using any suitable communication technique, including a WiFi connection, a cellular connection, a wired connection, etc. Further, the data processors 180A-N can communicate with the cloud system 150 using any suitable communication network, including a local area network, a wide area network, the Internet, etc.

In an embodiment, the cloud system 150 includes a cloud privacy service 162. As discussed further below with regard to subsequent figures, the cloud privacy service 162 can facilitate privacy centric data security by governing interactions between the user devices 100 and the data processors 180A-N. For example, in an embodiment private data for the users of the user devices 100 can be maintained in a secure repository at the cloud system 150 and the cloud privacy service 162 can govern access to this data by the data processors 180A-B. As another example, private data for the users of the user devices can be maintained at the user devices 100 or at another storage location maintained by the users (e.g., a storage location in the user's home or office) and the cloud privacy service 162 can govern access to this data. This is discussed in further detail with regard to FIGS. 2A-C and later, below.

As discussed further below, according to one or more disclosed embodiments a user can grant access to his or her private data to one or more of the data processors 180A-N, using the cloud privacy service 162. This access can be temporary, and can be limited (e.g., requiring notification to the user or approval by the user). The data processors 180A-N do not retain the user's private data, beyond the allowed temporary usage. Instead, the data remains stored in a repository controlled by the user (e.g., in the cloud 150 or at the user device 100).

In an embodiment, one or more of the data processors 180A-N can communicate with each other. For example, the data processor 180A may be a financial services provider, which sub-contracts some functions to the data processor 180N. As another example, the data processor 180A may be a medical provider and the data processor 180N may be an insurer. These are merely examples, and any suitable data processors can be used.

As discussed further below, the user can allow the data processor 180A to grant access to the user's private data the data processor 180N (e.g., by generating a data access block, as discussed with regard to FIGS. 3A-B and FIGS. 6A-6B, below). The data processor 180A can grant the data processor 180N the same access allowed for the data processor 180A, including any notification and approval requirements, or more limited access (e.g., a user might allow a medical provider to grant an insurer access to a user's biographical and credit card information, but not the user's medical records). This is discussed in more detail below.

In an embodiment, the user devices 100 and the data processors 180A-N can communicate with the cloud privacy service 162 using a suitable application programming interface (API). For example, a RESTful API, or any other suitable API, can be used. Alternatively, the user devices 100 and/or the data processors 180A-N can communicate with the cloud privacy service 162 using any other suitable means, including a webpage, network messages, e-mail, SMS messaging, social network messages, etc. For example, a user wishing to grant access to his or her private data to a medical provider could authorize the cloud privacy service 162 to send an e-mail or SMS message to the medical provider granting access and providing a link to the data to allow the medical provider authorized access to the data. In this way the data processor (e.g., the medical provider) can access the data without specifically implementing direct communication with the cloud privacy service 162.

Figure 2A:
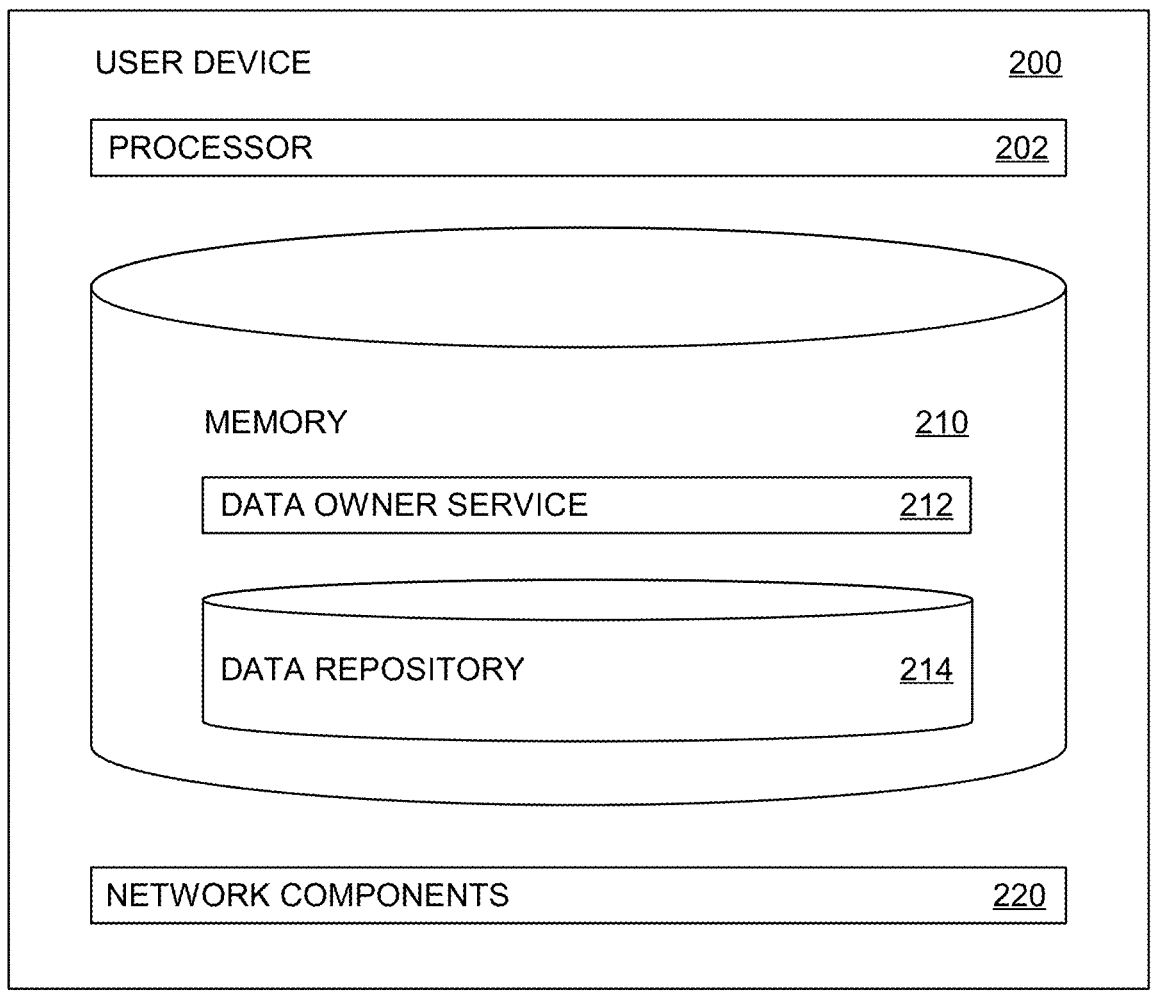
FIGS. 2A-C illustrate a user device, a cloud server, and a data processor in a system for privacy centric data security in a cloud environment, according to at least one embodiment.
Figure 2B:
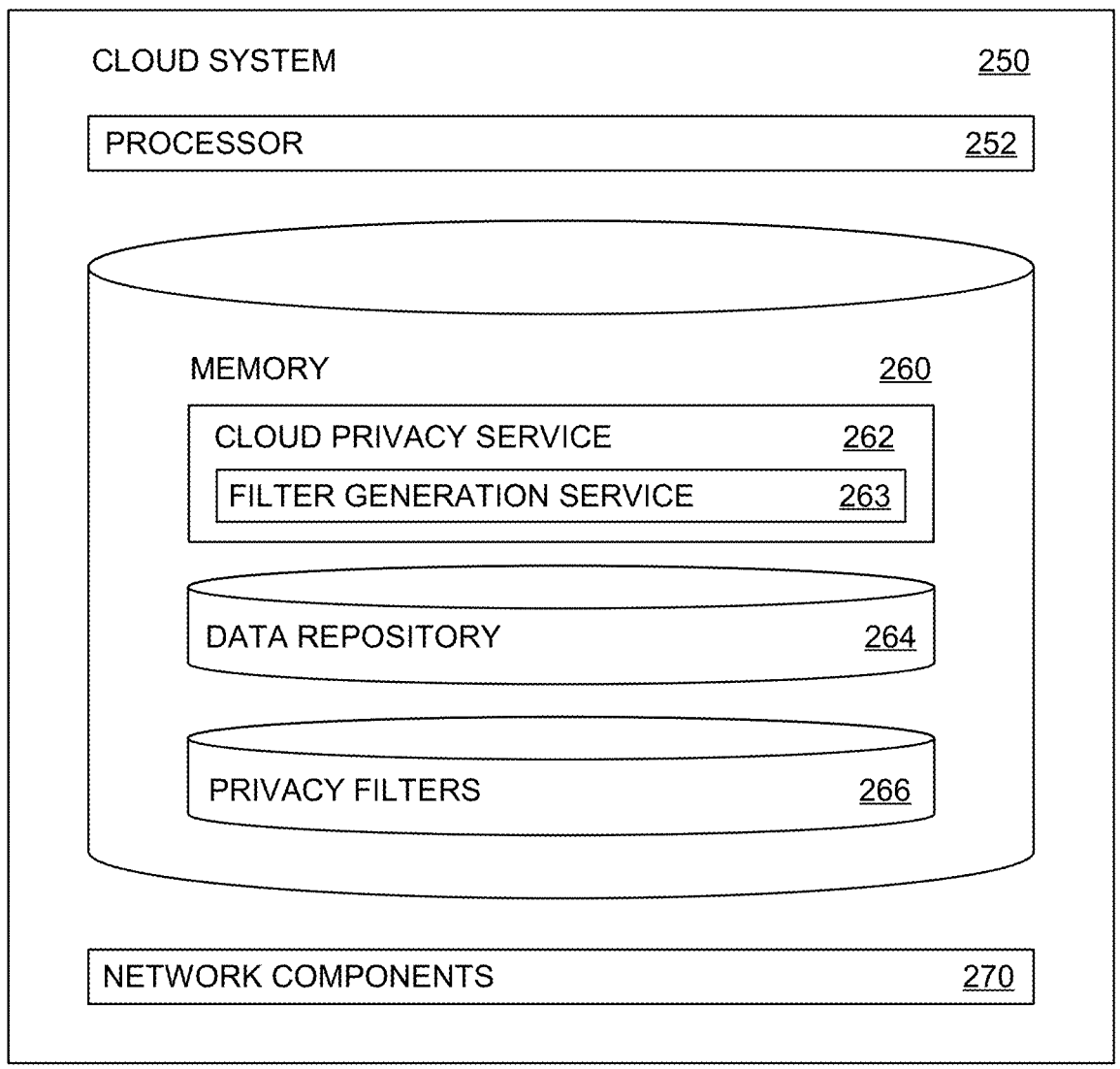
Figure 2C:
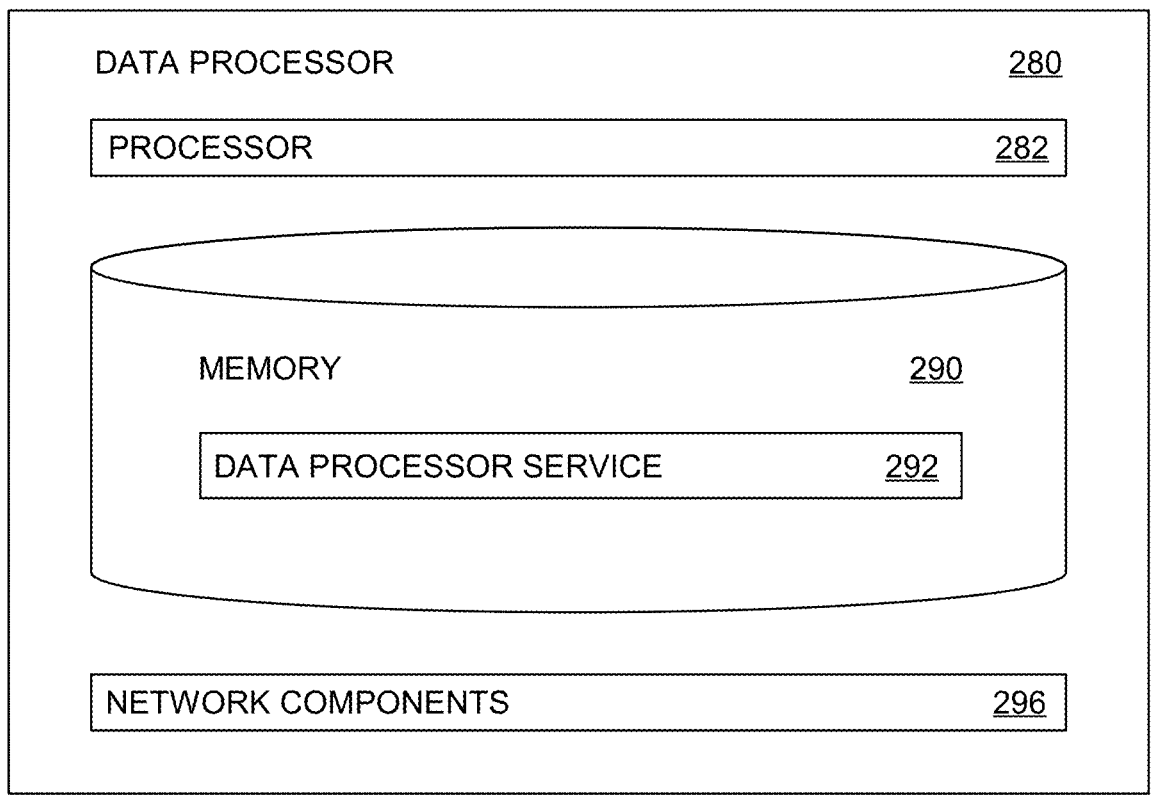

FIGS. 2A-C illustrate a user device, a cloud server, and a data processor in a system for privacy centric data security in a cloud environment, according to at least one embodiment. FIG. 2A is a block diagram illustrating a user device 200 (e.g., one of the user devices 100 illustrated in FIG. 1). The user device 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the user device 200 to interface with the cloud system 150, as discussed above in relation to FIG. 1. For example, the network components 220 can include wired, WiFi or cellular network interface components and associated software to facilitate communication between the user device 200 and the cloud system 150.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the user device client 200. The program code is generally described as various functional "applications" or "modules" within the memory 210, although alternate implementations may have different functions and/or combinations of functions.

Within the memory 210, a data owner service 212 facilitates privacy centric data security, as discussed in subsequent figures. For example, in an embodiment the user device 200 includes a data repository 214. The data repository 214 can store private data for the user of the user device 200. The data owner service 212 can be used to interact with a privacy service in a cloud system (e.g., the cloud privacy service 162 illustrated in FIG. 1 and the privacy service 262 illustrated in FIG. 2B) in order to ensure privacy centric data security. This is discussed in further detail in subsequent figures.

FIG. 2B is a block diagram illustrating a server (e.g., a virtual machine or a physical server, as discussed below with regard to FIG. 9) in a cloud system 250 (e.g. the cloud system 150 illustrated in FIG. 1). The cloud system 250 includes a processor 252, a memory 260, and network components 270. The processor 252 generally retrieves and executes programming instructions stored in the memory 260. The processor 252 is included to be representative of a single central processing unit (CPU), multiple CPUs, a single CPU having multiple processing cores, graphics processing units (GPUs) having multiple execution paths, and the like.

The network components 270 include the components necessary for the cloud system 250 to interface with a wireless communication network, as discussed above in relation to FIG. 1. For example, the network components 270 can include wired, WiFi or cellular network interface components and associated software to facilitate communication between the user device 200, the cloud system 250, and the data processor 280 illustrated in FIG. 2C.

Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory. The memory 260 generally includes program code for performing various functions related to use of the cloud system 250. The program code is generally described as various functional "applications" or "modules" within the memory 260, although alternate implementations may have different functions and/or combinations of functions.

Within the memory 260, a cloud privacy service 262 (e.g., the cloud privacy service 162 illustrated in FIG. 1) facilitates privacy centric data security, as discussed in subsequent figures. For example, in an embodiment the memory 260 includes a data repository 264. The data repository 264 can store private data for the user of the user device 200 (e.g., instead of, or in addition to, the data repository 214 illustrated in FIG. 2A). The cloud privacy service 262 can be used to interact with the data owner service 212 illustrated in FIG. 2A and the data processor service 292 illustrated in FIG. 2C, in order to ensure privacy centric data security.

Further, in an embodiment the cloud privacy service 262 can include a filter generation service 263. In an embodiment, the filter generation service 263 is used to generate user-defined filters for private data that can specify access parameters to the data (e.g., whether notification or approval is required, and what data can be accessed). This is discussed in more detail with regard to FIG. 5A, below. Further, the memory 260 can store one or more privacy filters 266, used to filter private data before providing the data to data processors (e.g., the data processor 280 illustrated in FIG. 2C). The cloud privacy service 262, data repository 264, and privacy filters 266 are all discussed in further detail in subsequent figures.

FIG. 2C is a block diagram illustrating a data processor 280 (e.g., one of the data processors 180A-N illustrated in FIG. 1). The data processor 280 includes a processor 282, a memory 290, and network components 296. The processor 282 generally retrieves and executes programming instructions stored in the memory 290. The processor 282 is included to be representative of a single central processing unit (CPU), multiple CPUs, a single CPU having multiple processing cores, graphics processing units (GPUs) having multiple execution paths, and the like.

The network components 296 include the components necessary for the data processor 280 to interface with a wireless communication network, as discussed above in relation to FIG. 1. For example, the network components 296 can include wired, WiFi or cellular network interface components and associated software to facilitate communication between the cloud system 250 and the data processor 280, and between the data processor 280 and another data processor.

Although the memory 290 is shown as a single entity, the memory 290 may include one or more memory devices having blocks of memory associated with physical addresses, such as random access memory (RAM), read only memory (ROM), flash memory, or other types of volatile and/or non-volatile memory. The memory 290 generally includes program code for performing various functions related to use of the data processor 280. The program code is generally described as various functional "applications" or "modules" within the memory 290, although alternate implementations may have different functions and/or combinations of functions.

Within the memory 290, a data processor service 292 facilitates privacy centric data security, as discussed in subsequent figures. For example, in an embodiment the data processor service 292 can be used to interact with the cloud privacy service 262 illustrated in FIG. 2B, in order to ensure privacy centric data security. This is discussed in further detail in subsequent figures.

Figure 3A:
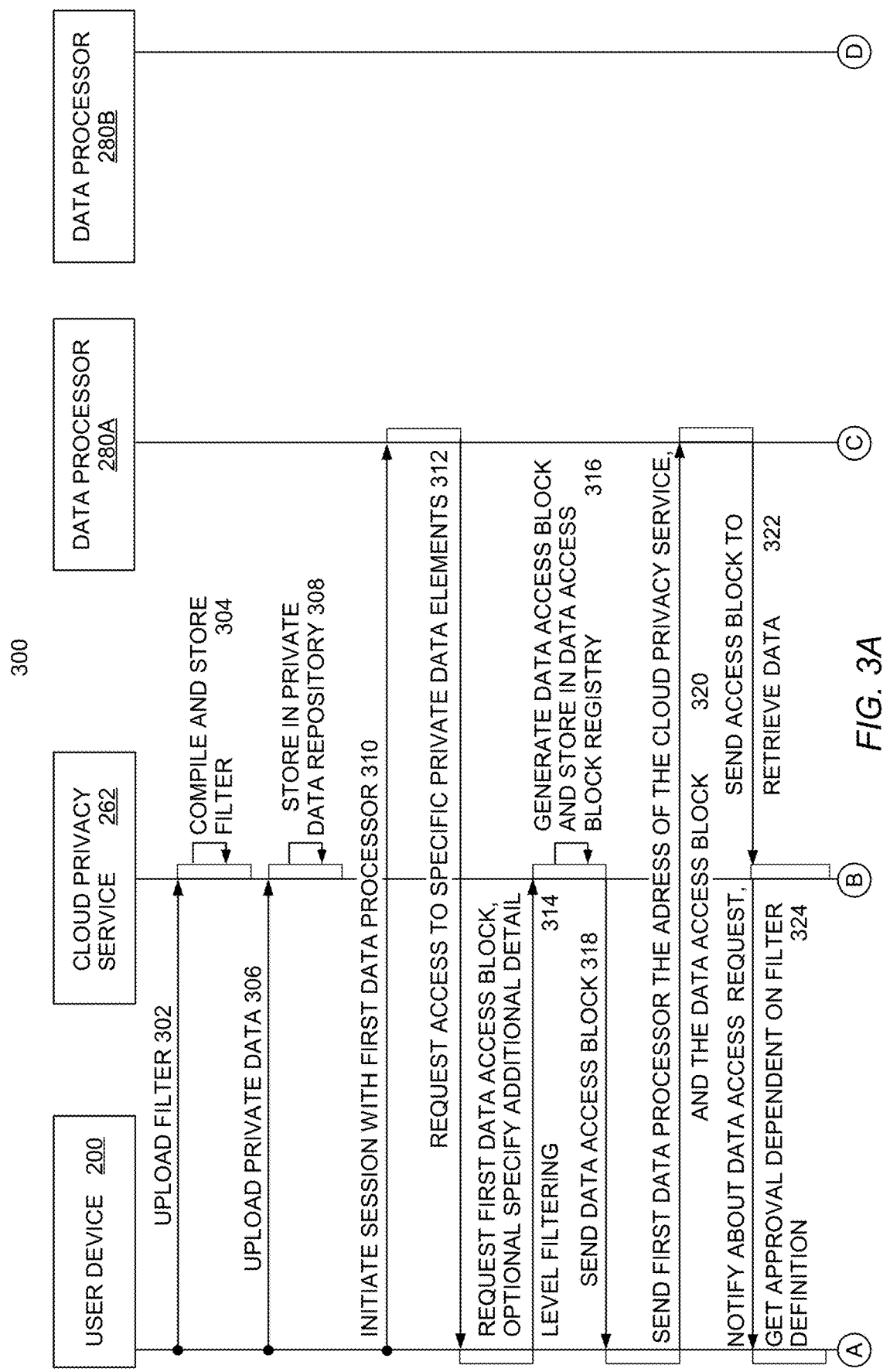
FIGS. 3A-B are a flow diagram illustrating data flow for privacy centric data security in a cloud environment, according to at least one embodiment.
Figure 3B:
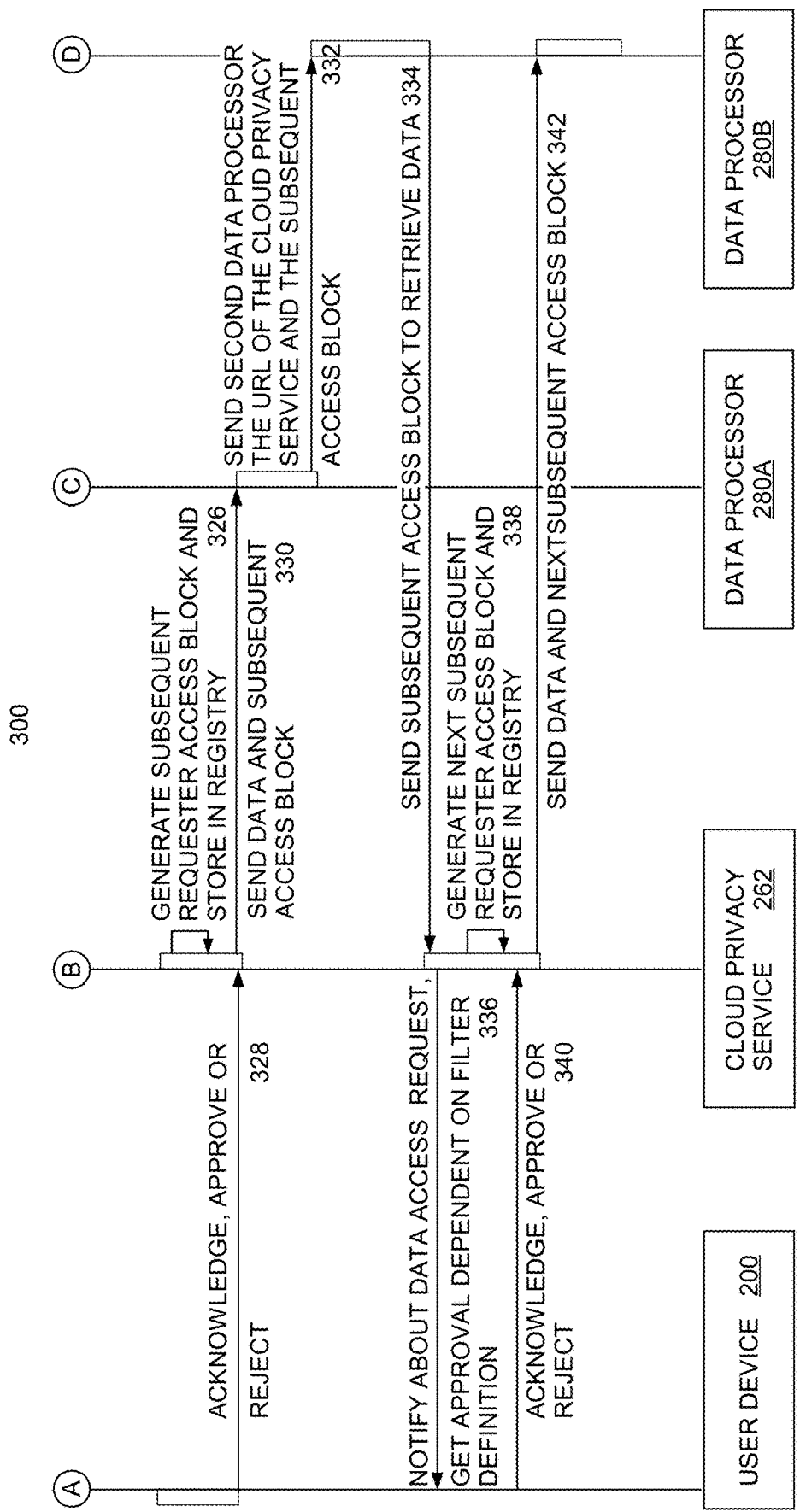

FIGS. 3A-B are a flow diagram 300 illustrating data flow for privacy centric data security in a cloud environment, according to at least one embodiment. At block 302 a user uploads a filter to the cloud privacy service 262 (e.g., using the data owner service 212 illustrated in FIG. 2A). In an embodiment, filters are used to govern access by a data processor to the user's private data. A filter can be generated by the user (e.g., a customer filter), or can be a standard filter (e.g., providing read-only access, read and write access, requiring verification before access, etc). Further, in an embodiment, a filter can be code (e.g., source code or compiled code) for execution by the cloud privacy service. Filters are discussed in further detail with regard to FIGS. 5A-C, below.

At block 304, the cloud privacy service 262 compiles the received filter (e.g., if necessary) and stores the filter (e.g., in the privacy filter repository 266 illustrated in FIG. 2B). For example, the user device 200 can upload to the cloud privacy service source code for a filter providing read access to the user's private data (or a particular subset of the user's private data). The cloud privacy service 262 can compile the received filter and store the compiled filter in the privacy filter repository 266, for later execution. This is again discussed in more detail with regard to FIGS. 5A-C, below.

At block 306, the user device 200 uploads private data to the cloud privacy service 262 (e.g., using the data owner service 212 illustrated in FIG. 2A). As discussed above with regard to FIGS. 2A-2B, in one embodiment a cloud system (e.g., the cloud system 250 illustrated in FIG. 2B) stores the user's private data (e.g., in the data repository 264 illustrated in FIG. 2B). In this embodiment, the user device 200 uploads the private data to the cloud privacy service. In another embodiment, the user's private data is maintained elsewhere (e.g., at the user device 200) instead of, or in addition to, at the cloud system 250.

At block 308 the cloud privacy service 262 stores the private data in a data repository (e.g., the data repository 264 illustrated in FIG. 2B). At block 310, the user device 200 initiates a session with the first data processor (e.g., the data processor 280A). For example, as discussed above, the data processor 280A can be a medical provider, a financial institution, or any other entity seeking access to the user's private data.

At block 312, the data processor 280A requests access to specific private data elements relating to the user. In an embodiment, the data processor 280A is communicatively coupled to the user device 200, either directly, through a cloud service (e.g., the cloud service 150 illustrated in FIG. 1), or through another communication path. The data processor 280A transmits the data access request to the user device (e.g., through the cloud system 250 using the cloud privacy service 262).

At block 314, the user device 200 requests from the cloud privacy service 262 a first data access block relating to the requested data and the requesting entity. Data access blocks are described in more detail with regard to FIGS. 6A-B. In an embodiment, a data access block describes what data a requestor can access, and how the requestor can access that data (e.g., always allow access, require permission from the user on each access, require permission daily/weekly/monthly, etc.). A data access block can further describe how a sub-requestor related to the initial requestor can access the data. For example, the requestor could be a medical provider, and the data access block could describe both who at the medical provider can access the information and what entities can receive the information from the medical provider (e.g., what information can be provided to insurers, or to other medical providers). In an embodiment, data access blocks provide granular control of private data to the user. Data access blocks are discussed in further detail with regard to FIGS. 6A-6B, below.

Figure 8A:
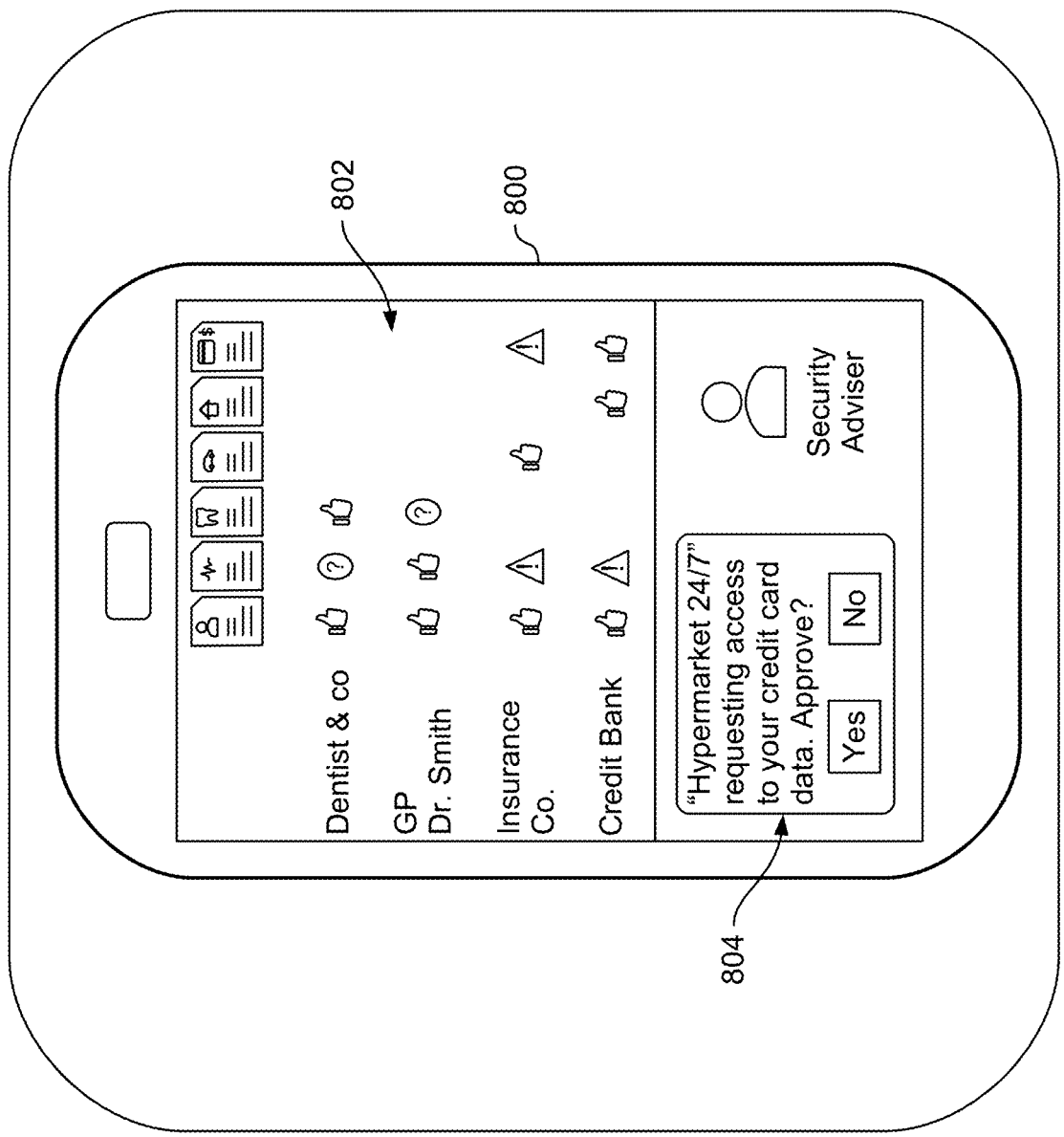
FIGS. 8A-B illustrate a user interface for privacy centric data security in a cloud environment, according to at least one embodiment.
Figure 8B:
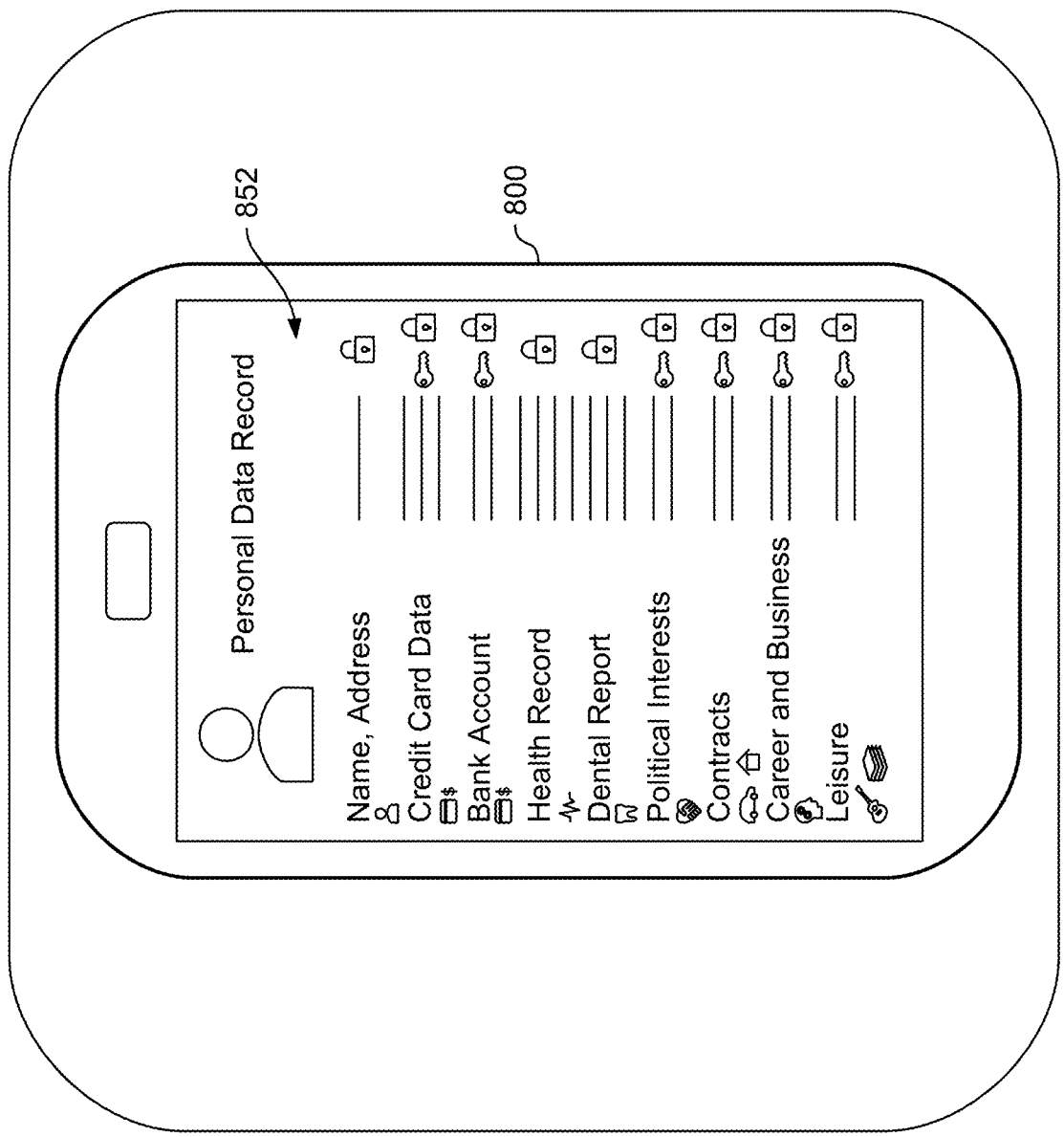

Further, at block 314, in an embodiment the user device 200 can specify additional detail level filtering for the data access block. In an embodiment, a privacy filter (e.g., a privacy filter uploaded to the cloud privacy service at block 302) specified filtering based on data type. At block 314, the user device can specify additional filtering for the specific data requested by the data processor 280A (e.g., in addition to the existing filters). FIGS. 8A-8B discuss a user interface to facilitate block 314.

At block 316, the cloud privacy service generates a data access block and stores the data access block in a data access block registry (e.g., as part of the data repository 264 illustrated in FIG. 2B). Data access blocks are discussed in further detail with regard to FIGS. 6A-B.

At block 318, the cloud privacy service 262 sends to the user device 200 a data access block for the requested private data. This is again discussed further with regard to FIGS. 6A-B, below. Alternatively, or in addition, the cloud privacy service 262 can notify the user device 200 of the location of the appropriate data access block (e.g., if the data access block has previously been generated and is maintained at the user device, or at another location). For example, the cloud privacy service 262 could notify the user device 200 of an identifier associated with a data access block stored locally at the user device, or at a location accessible to the user device.

At block 320, the user device 200 sends to the data processor 280A (e.g., the first data requestor) an address for the cloud privacy service 262, along with the data access block. For example, the user device 200 can transmit to the data processor 280A a Uniform Resource Locator (URL) identifying the cloud privacy service 262. The data processor 280A can then use the URL to access the cloud privacy service 262. A URL is merely one example, and any suitable address or identifier can be used. Further, the user device 200 sends to the data processor 280A the data access block describing the allowed access for the data processor 280A. Data access blocks are discussed in further detail with regard to FIGS. 6A-B.

At block 322, the data processor 280A sends the data access block (e.g., received from the user device 200) to the cloud privacy service 262 in order to retrieve the desired data. In an embodiment, the data processor 280A is permitted to access the data (e.g., as described in the data access block) and at block 330 the cloud privacy service 262 transmits the data to the data processor 280A.

Alternatively, or in addition, the user can specify that she must receive notice, and/or provide approval, before the data processor 280A is permitted to access the requested data. This can be defined by the user, for example, using a suitable filter and the requirement can be specified in the data access block. As discussed below, the user can define differing controls (e.g., notice required, approval required, or neither required) for different data processors (e.g., approval may be required for one merchant to access a user's credit card information but not for another merchant) and for different data (e.g., approval might be required for access to medical information but not for a user's e-mail address). At block 324, in this scenario, the cloud privacy service 262 notifies the user device 200 about the data access and, if necessary, seeks approval. At block 326, the cloud privacy service generates a subsequent requestor access block (e.g., denoting the request) and stores the access block in the registry (e.g., the data repository 264 illustrated in FIG. 2B). At block 328, the user acknowledges, approves, or rejects the data access request, as appropriate depending on the data access requirements and the user's preference. FIGS. 8A-B describe a user interface to allow the user to acknowledge, approve, or reject the data access block. Assuming the user does not reject the request, the flow proceeds to block 330 and the cloud privacy service sends the data and the subsequent access block to the data processor 280A.

In an embodiment, multiple data processors can seek access to the private data (e.g., a general medical practitioner and a specialist medical practitioner, a medical facility and an insurer, a financial institution and a credit agency, or any other suitable data processors). At block 332, the data processor 280A sends to the second data processor 280B the URL of the cloud privacy service 262 and the subsequent access block.

At block 334, the second data processor 280B sends to the cloud privacy service 262 a request for the desired data along with the subsequent access block. In an embodiment, the user has authorized access for the second data processor 280B as well as for the first data processor 280A. In this embodiment, the flow proceeds to block 342 and the cloud privacy service 362 sends the data to the second data processor 280B.

Alternatively, or in addition, the user can specify that he or she must receive notice, and/or provide approval, before the second data processor 280B is permitted to access the requested data. This can be defined by the user, for example, using a suitable filter and the requirement can be specified in the data access block. At block 336, in this scenario, the cloud privacy service 262 notifies the user device 200 about the data access and, if necessary, seeks approval. At block 338, the cloud privacy service generates a next subsequent requestor access block (e.g., denoting the request) and stores the access block in the registry (e.g., the data repository 264 illustrated in FIG. 2B). At block 340, the user acknowledges, approves, or rejects the data access request, as appropriate depending on the data access requirements and the user's preference. FIGS. 8A-B describe a user interface to allow the user to acknowledge, approve, or reject the data access block. Assuming the user does not reject the request, the flow proceeds to block 342 and the cloud privacy service sends the data and the subsequent access block to the data processor 280A.

In an embodiment, the cloud privacy service 262 can further request that the data processors 280A and 280B delete the user's private data after a duration specified by the user. As discussed above, private data can be deleted automatically by the data processors 280A and 280B (e.g., to be allowed access to the private data the data processor must agree to delete the data as required), could be enforced by providing the data processor with a version of the data that will expire after a specified time period (e.g., self-enforcing), and by the cloud privacy service 262 transmitting a request to the data processor to delete the data.

Figure 4A:
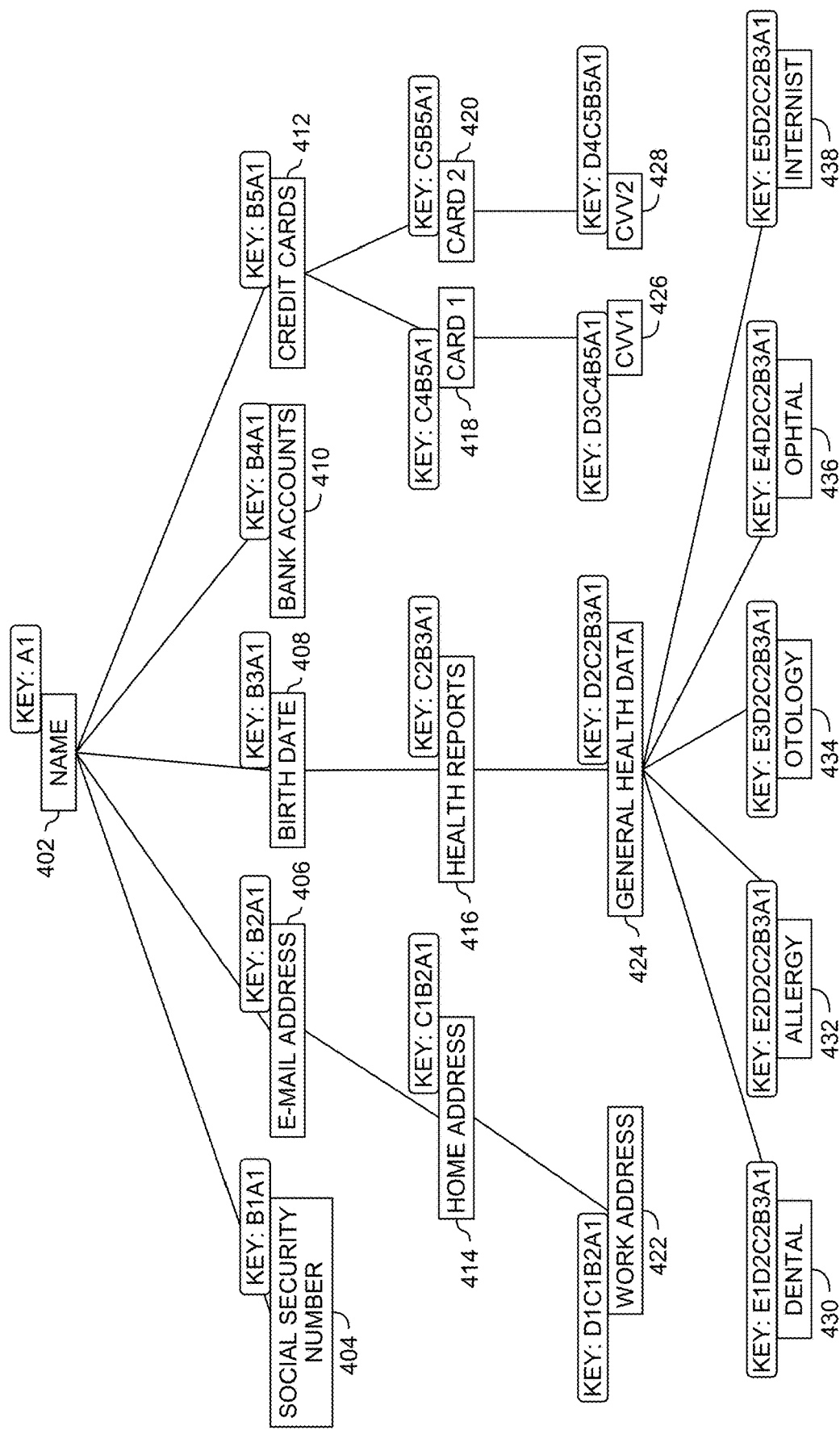

FIGS. 4A-C illustrate data structures for privacy centric data security in a cloud environment, according to at least one embodiment. FIG. 4A illustrates a hierarchical view of private user data 402-438, along with cumulative keys associated with the data, according to at least one embodiment. In an embodiment, private user data is stored in a hierarchical relationship (e.g., in a data repository 264 in the cloud system 250, as illustrated in FIG. 2B, or in a data repository 214 in the user device 200, as illustrated in FIG. 2A). For example, a user's name is stored in a field 402. The user's social security number is stored in a field 404 that is a child of the name field 402. The user's e-mail address 406 is stored in a field 406 which is a sibling of the social security number field 404 and a child of the name field 402. The user's home address is stored in a field 414 that is a child of the e-mail address field 406.

Further, in an embodiment, a given field of private information can be accessed using a key. These keys can be given to data processors (e.g., the data processor 280 illustrated in FIG. 2C), and the data processor can present the key to the service providing data access (e.g., the cloud privacy service 262 illustrated in FIGS. 2B and 3). If the key is valid, the service provides the data. In an embodiment, each key is signed (e.g., using public/private key encryption or another suitable digital signature) or secured to verify that it is valid.

Further, different data processors can be provided with different signatures, and the differing signatures can be used to track who is attempting to access the data. For example, as illustrated in FIG. 3, the data processor 280A can be provided with a key with different signature from the signature provided to the data processor 280B, and the cloud privacy service 262 can use these differing signatures to track which data processor is attempting to access a given data field. For example, the cloud privacy service 262 can log accesses to data using a given signature.

Further, in an embodiment, the keys can be hierarchical and can build on each other. For example, shorter keys can allow access to higher level data, while longer keys can allow access to more specific information. As illustrated in FIG. 4A, a key "A1" provides access to the name field 402. A key "B2A1" (e.g., the name field key with the addition of "B2") provides access to the e-mail address field 406. A key "C1B2A1" provides access to the home address field 414. Similarly, a key "B3A1" provides access to a user's birthdate. But a longer key is required for access to more specific (e.g., more private) information. A key "C2B3A1" is required for access to a health reports field 416, a key "D2C2B3A1" is required for access to a general health data field 424, and a key "E2D2C2B3A1" is required for access to allergy data.

Further, as discussed above and illustrated 4A, a longer key has within it a shorter key to allow access to more general data. This allows one data processor that has been granted to a specific data field (e.g., a medical provider with access to the general health data field 424 using the key "D2C2B3A1") to provide a shorter key to another entity to allow access to more general data and not the specific data (e.g., providing an insurer with a key "B3A1" to allow access to the birth data field 408 but not general health data field 424). Hierarchical data, and hierarchical keys, as discussed above, is merely one example embodiment. Private data can also be stored in any other suitable fashion (e.g., not hierarchical).

FIGS. 4B-C illustrate storage of private data in a table 450, according to at least one embodiment. For example, the table 450 illustrated in FIGS. 4B-C can be a database table (e.g., in a relational database or any other suitable database) storing the private data illustrated in FIG. 4A (e.g., in a data repository 264 as illustrated in FIG. 2B or 214 as illustrated in FIG. 2A). The item index column 462 provides an index for the data (e.g., to allow the database to identify the data). The item label column 464 describes the data.

The item key column 466 provides the key used for a data processor to access the data. In an embodiment, the keys can be hierarchical as discussed above in relation to FIG. 4A. The value column 468 provides the data itself. The default filters column 470 provides a default filter level for access to the data. For example, the default filter for name data could be to allow "read always" to data processors (allowing access without specific approval, by default), while the default filter for general health data could be "approve by me", requiring a user to approve any access to this data (e.g., by default). In an embodiment, the default filter levels can be encoded (e.g., using constant integers to represent levels of filtering) instead of using human-readable language. In an embodiment, specific filters can also be provided by users, as discussed below with regard to FIGS. 5A-C.

Figure 5A:
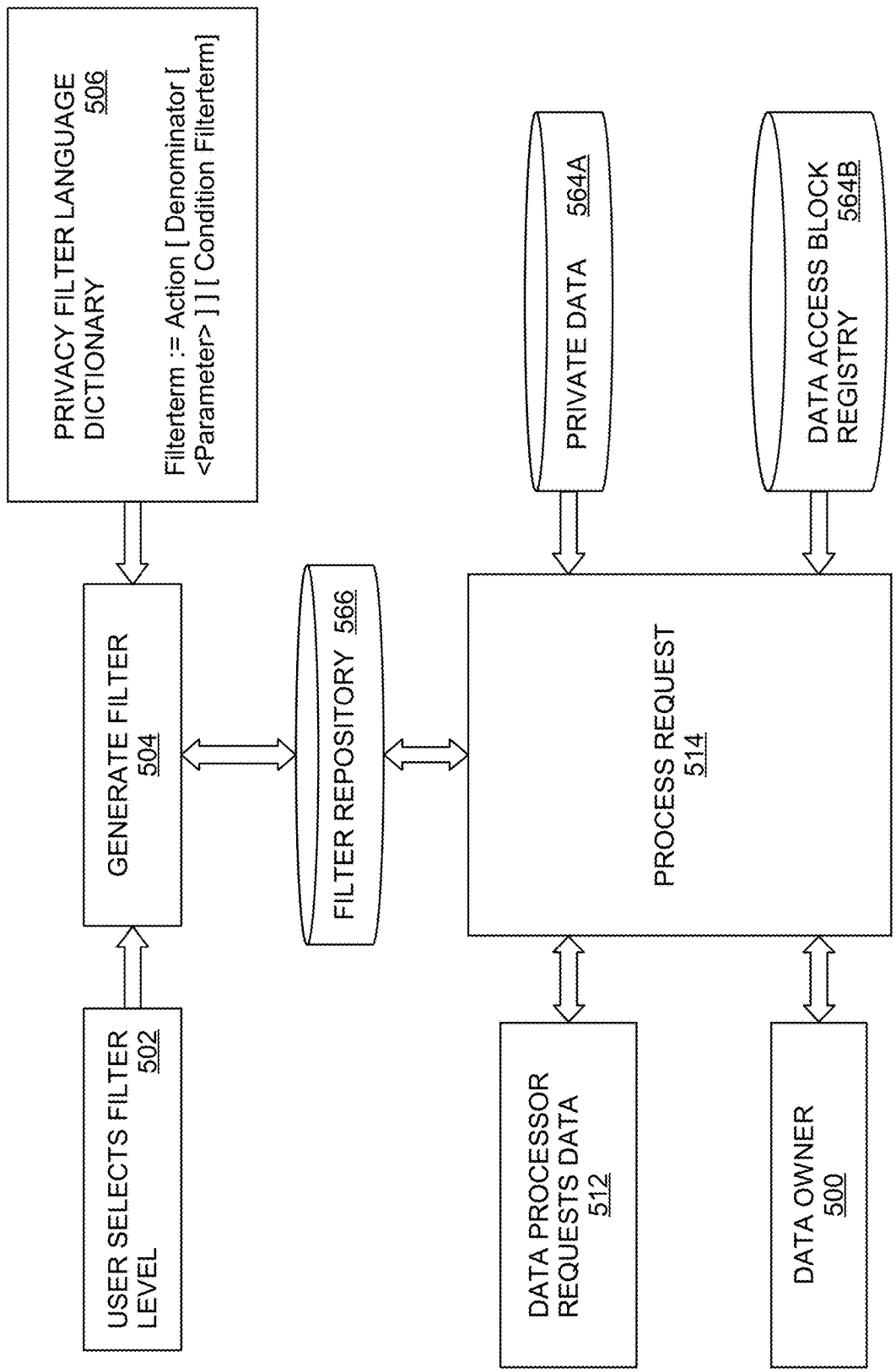

FIGS. 5A-C illustrate privacy filters (e.g., data shaping filters) for privacy centric data security in a cloud environment, according to at least one embodiment. FIG. 5A illustrates generating, storing, and using, privacy filters for privacy centric data security in a cloud environment, according to at least one embodiment. At block 502, a user (e.g., the data owner 500) selects the desired filter level. In an embodiment, the user compiles a filter term with instructions and requirements for accessing his private data. For example, the user could specify "approve by me and read once by <dentist> and valid until august 2019." A user interface to provide this is discussed in relation to FIGS. 8A-B, below.

At block 504, a filter generation service (e.g., the filter generation service 263 illustrated in FIG. 2B) generates the filter. In an embodiment, the filter generation receives and parses the filter term (e.g., from block 502). The filter generation service then uses the privacy filter language dictionary 506 to tokenize the filter.

For example, the privacy filter language dictionary can specify:
Filterterm:=Action [Denominator [<Parameter>]][|Condition Filterterm].

The Action can be any suitable action, including "approve," "create," "read," "update," "delete," "forward," "validate," or "default." The Denominator can be any suitable denominator, including, "by," "to", "once," "twice," "never," "always," "until," or "only." The Condition can be any suitable condition, including "and," "or," or "and not."

The filter generation service can then analyze the tokens, generate suitable program code, compile the code to machine executable code (if necessary), and store the filter (e.g., the compiled filter) in the filter repository 566. FIG. 5B illustrates examples of suitable filters, including human-readable program code.

At block 512, a data processor (e.g., the data processor 280 illustrated in FIG. 2C) requests private data. In an embodiment, the data processor transmits the request to the cloud privacy service, and provides a valid data access block. This is described in more detail with regard to FIG. 3, above.

At block 514, a privacy service (e.g., the cloud privacy service 262 illustrated in FIG. 2B) processes the request. For example, the privacy service can receive the data access block from the data processor (e.g., transmitted at block 512). The privacy service can access a data access block registry 564B (e.g., a data access block registry included as part of the data repository 264 illustrated in FIG. 2B) and can validate the data access block using the registry. For example, the privacy service can determine whether a matching data access block is included in the data access block registry 564B. In an embodiment, the data access block is suitably protected to ensure that it is valid (e.g., signed, encrypted, etc.).

Assuming the data access block is valid, the privacy service can access the requested data from the private data repository 564A (e.g., part of the data repository 264 illustrated in FIG. 2B). Further, the privacy service can retrieve a default filter for the data from the private data repository 564A (e.g., the detail filters column 470 illustrated in FIG. 4B).

The privacy service can then retrieve any filter program modules corresponding to the requested data, from the filter repository 566, and can execute the filter program modules. This may require the privacy service to contact the data owner 500 (e.g., the user of the user device 200 illustrated in FIG. 2A) to provide notice of the request from the data processor, and to receive acknowledgment, approval, or denial of the request (as appropriate, depending on the filter) from the data owner 500. In an embodiment, as discussed above in relation to FIG. 3, the privacy service can then generate a next data access block, update the data access block registry 564B, and send the data to the requesting data processor.

FIGS. 5B-C illustrate example privacy filters for privacy centric data security in a cloud environment, according to at least one embodiment. For example, the table 550 illustrated in FIGS. 5B-C can be a database table (e.g., in a relational database or any other suitable database) storing filters (e.g., in a filter repository 566 as illustrated in FIG. 5A). The filter identifier column 552 provides an index for the data (e.g., to allow the database to identify the data). The filter term column 554 identifies the short term for the filter (e.g., the user-friendly term to use in a user interface, for example as described below with regard to FIGS. 8A-B). The program module column 556 illustrates human readable program code implementing the filter for a given row. This is merely one example, and other suitable program code can be used.

FIGS. 6A-B illustrate data access block structures for privacy centric data security in a cloud environment, according to at least one embodiment. FIG. 6A illustrates an example structure 600 for a data access block (e.g., as discussed above), according to at least one embodiment. In an embodiment, a data access block can be used to track, and enforce, what data a particular data processor is allowed to access, and for how long. For example, a data access block can limit access by data type (e.g., by item) and by duration (e.g., allowing access for a specified period of time). A type column 602 illustrates the type of a field in the data access block and a content column 604 illustrates the content of the corresponding field in that row.

For example, a data access block can be made up of a signature, followed by a series of blocks. Each block can be made up of a date, a series of one or more items, and a series of one or more filters. The date can be a timestamp denoting the creation of the block. The item(s) can be identifiers for the privacy data item in the data repository. For example, the item(s) can be the value in the item index column 462, illustrated in FIG. 4B, corresponding with the data field. The filter can be a filter term (e.g., as illustrated in column 554 illustrated in FIG. 5B) or an identifier for the filter in the filter repository (e.g., as illustrated in column 552 illustrated in FIG. 5B). The signature can be a signature over the list of blocks. In an embodiment, as discussed above, the signature is generated by the privacy service (e.g., the cloud privacy service 262 illustrated in FIG. 2B) using an owner specific secret key (e.g., using public key encryption).

FIG. 6B illustrates an example data access block registry 650 (e.g., the data access block registry 564B illustrated in FIG. 5A), according to at least one embodiment. A unique identifier column 652 provides a unique identifier for each data access block. A requestor column 654 provides an identifier for the data processor that requested the data that led to creation of the data access block. A data access block column 656 provides the data access block (e.g., as illustrated in FIG. 6A). A block usage column 658 provides a log of usage of the data access block. For example, the block usage column 658 can track each use of the data access block column 656 by the requestor column 654.

In an embodiment, a log can be used to provide reporting to the user, to identify errors or unauthorized data access, or for other suitable purposes. For example, in an embodiment a privacy service (e.g., the cloud privacy service 262 illustrated in FIG. 2) could provide a report to a user of which data processor(s) have accessed the user's private data. This could be provided to the user periodically (e.g., using e-mail or physical mail) or could be accessible upon request at a webpage, within a mobile application, or at any other suitable location.

Figure 7:
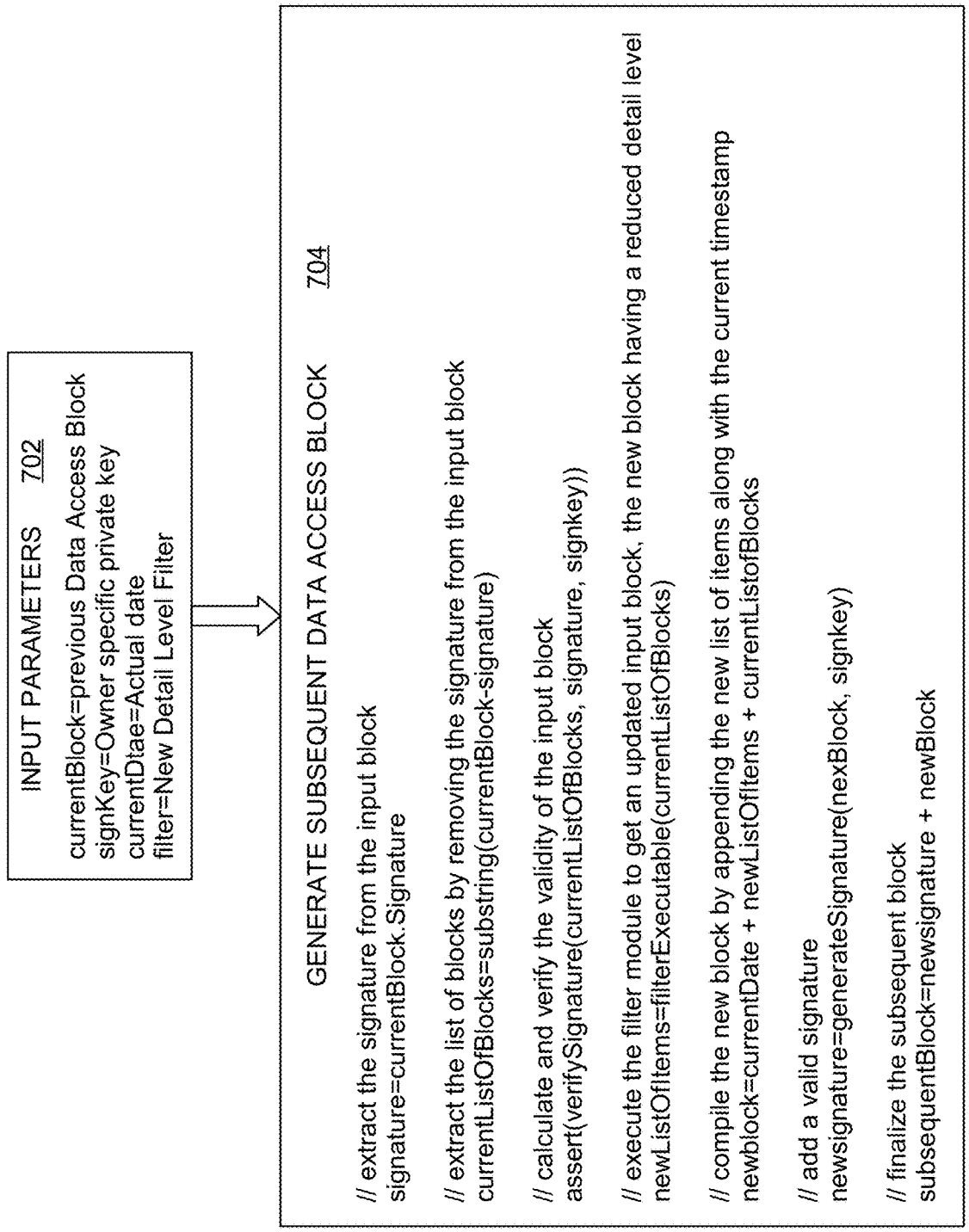
FIG. 7 illustrate techniques for navigating data access block structures in a privacy centric data security in a cloud environment, according to at least one embodiment.

FIG. 7 illustrate techniques for navigating data access block structures in a privacy centric data security in a cloud environment, according to at least one embodiment. As illustrated, at block 702 a privacy service (e.g., the cloud privacy service 262 illustrated in FIG. 2B) receives input parameters. At block 704, the privacy service uses these parameters to generate a subsequent data access block (e.g., as illustrated at blocks 326 and 338 in FIG. 3).

For example, the currentBlock input parameter could be [<signature>|<timestamp>|<item_index>|<filter_index>] (e.g., using the data access block structure illustrated in FIG. 6A. This represents the previous data access block. The signKey input parameter could be the user's specific private key. The currentDate input parameter could be a timestamp representing the current date and time. The filter parameter could be the new filter to use (e.g., an index to the filter in the filter repository, or a shortname for the filter). The output could be a subsequent block generated based on these inputs, using the human readable code illustrated in block 704. This is merely one example, and other suitable techniques can be used.

FIGS. 8A-B illustrate a user interface for privacy centric data security in a cloud environment, according to at least one embodiment. FIG. 8A illustrates a user interface to allow a user to set data-processor specific privacy filter controls for privacy centric data security in a cloud environment, according to at least one embodiment. A user device 800 includes an interface 802 that allows a user to graphically set desired security parameters for various data processors. Using graphical icons, text, or any other suitable visual or audio representation, the user can define how entities are allowed to access the user's private data.

For example, a user can specify that a dentist is allowed to read the user's biographical information (e.g., name, address, phone number) without notification, and the user's dental records without notification, but the dentist must receive approval before accessing the user's medical information. As another example, the user can specify that an insurance company can access the user's biographical and automobile information without notification, but cannot access the user's medical information.

The user device 800 further includes an interface 804 to provide notification to the user of an access request, and to allow the user to approve or deny the request. For example, the illustrated embodiment shows an entity "Hypermarket 24/7" (e.g., a grocery store) seeking access to the user's credit card information. The user can approve or deny the request.

FIG. 8B illustrates a user interface to allow a user to set data specific privacy filter controls for privacy centric data security in a cloud environment, according to at least one embodiment. For example, a user device 800 includes an interface 852 that depicts the user's private data. The user can use graphical icon, textual representations, audio indications, etc. to control default access to this data. For example, the user can determine that, by default, any entity can access the user's name and address without notification or approval. The user can further determine that, by default, an entity must receive approval before accessing the user's credit card information. The user can further determine that, by default, no entity can access the user's health record.

As discussed above, each of these defaults can be overridden by a specific privacy filer applied to a specific entity. For example, the user could create a filter (e.g., using the interface illustrated in FIG. 8A) to allow a medical provider to access medical data without approval, but to require the medical provider to seek approval before accessing credit card data.

Figure 9:
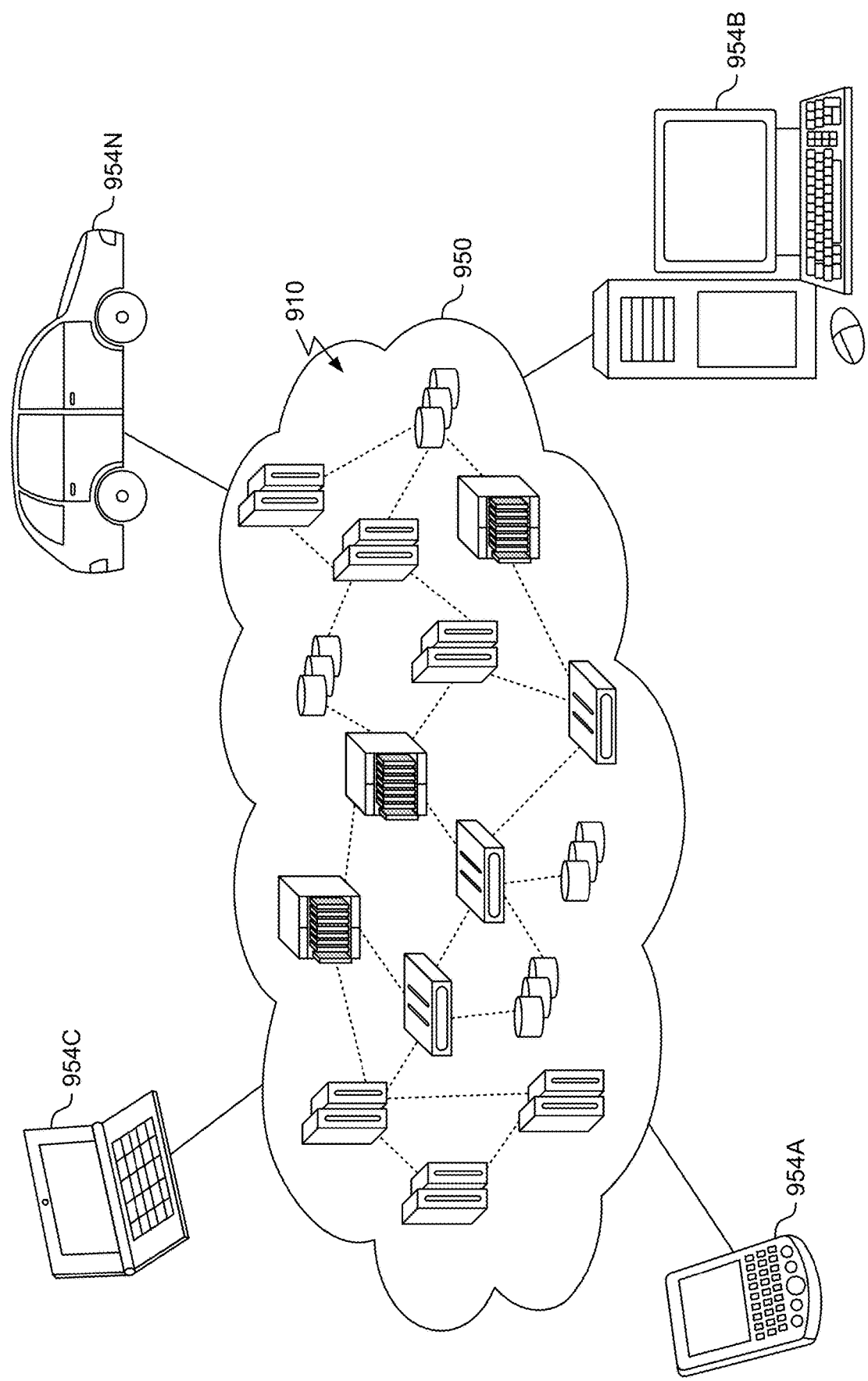
FIG. 9 depicts a cloud computing environment, according to at least one embodiment.

FIG. 9 depicts a cloud computing environment, according to at least one embodiment. It is to be understood that although this disclosure includes a detailed description on cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
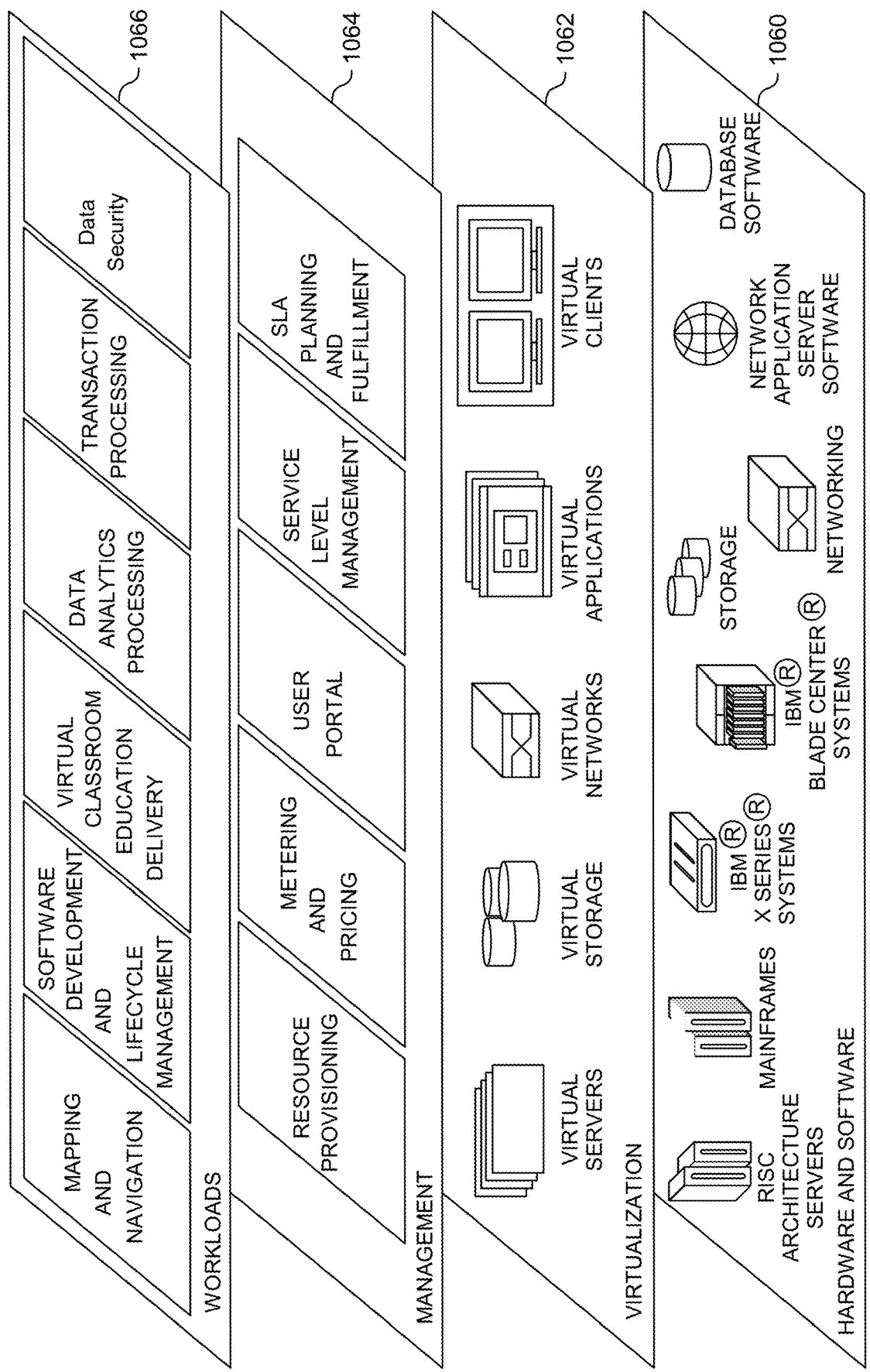
FIG. 10 depicts abstraction model layers, according to at least one embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes; RISC (Reduced Instruction Set Computer) architecture based servers; servers; blade servers; storage devices; and networks and networking components. In some embodiments, software components include network application server software and database software.

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a cloud privacy service. In an embodiment, some or all of the modules of the cloud system 250 could be implemented in the workloads layer 1066. For example, the cloud privacy service 262, the filter generation service 263, the data repository 264, and the privacy filter repository 266, could be implemented in the workloads layer 1066. In an embodiment, the cloud privacy service 262 could execute on a computing system in the cloud (e.g., in the workloads layer 1066) and the data repository 264, and the privacy filter repository 266 stored on the cloud. Doing so allows access to this information from any computing system attached to a network connected to the cloud (e.g., the Internet).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, at a cloud data privacy service, a request from a user device to permit a first data processor to access private data associated with the user, the request comprising:
      a request for a first data access block relating to the private data; and
      a data filter describing one or more access parameters relating to the first data processor and the private data;
   generating the first data access block, at the cloud data privacy service, based on the private data and the data filter, comprising:
      using an encryption key to digitally sign the first data access block;
   transmitting the generated first data access block from the cloud privacy service to the user device, wherein the user device is configured to transmit the first data access block to the first data processor;
   receiving, at the cloud data privacy service, a request from the first data processor for the private data, the request comprising the first data access block; and
   determining, at the cloud data privacy service, that the first data access block received from first data processor is valid by validating the digital signature for the first data access block, and in response granting the first data processor at least partial access to the private data.

2. The method of claim 1, wherein a scope of the at least partial access to the private data granted to the first data processor is based on the first data access block.

3. The method of claim 1, further comprising:
   determining, at the cloud data privacy service, based on the first data access block received from first data processor, that the data filter specifies user approval prior to granting the first data processor access to the private data, and in response:
      transmitting from the cloud data privacy service to the user device a request for approval; and
      receiving, at the cloud data privacy service from the user device, a message indicating approval.

4. The method of claim 3, wherein the determining, at the cloud data privacy service, that the data filter specifies user approval further comprises:
   determining, based on the first data access block received from first data processor, an identifier for the data filter; and
   retrieving from a filter repository the data filter based on the identifier.

5. The method of claim 4, wherein the data filter is generated based on input from the user at the user device.

6. The method of claim 1, wherein the user device is configured to transmit an address for the cloud privacy service to the first data processor along with the first data access block, and wherein the first data processor is configured to transmit the request for the private data to the cloud privacy service based on the address.

7. The method of claim 1, further comprising:
   providing, by the first data processor to a second data processor, access to at least a portion of the private data, comprising:
      generating, at the cloud data privacy service based on the first data access block, a second data access block relating to a second data processor;
      transmitting, from the cloud data privacy service to the first data processor, the second data access block, wherein the first data processor is configured to provide the second data access block to the second data processor;
      receiving, at the cloud data privacy service from the second data processor, a request to access the at least the portion of the private data, the request comprising the second data access block; and
      determining, at the cloud data privacy service, that the second data access block received from second data processor is valid, and in response granting the second data processor at least partial access to the at least the portion of the private data.

8. The method of claim 7, wherein the second data access block reflects access to only a portion of the private data for the second data processor.

9. The method of claim 1, further comprising:
storing the first data access block in a data access block registry.

10. The method of claim 1, wherein the first data processor is granted access to the private data for a limited duration, and wherein the first data processor is configured to remove the private data after the limited duration expires.

11. The method of claim 1, wherein the cloud privacy service operates in a public cloud environment independent from the first data processor, and wherein the private data is maintained in the public cloud environment.

12. A system, comprising:
a processor; and
a memory storing a program, which, when executed on the processor, performs an operation, the operation comprising:
receiving, at a cloud data privacy service, a request from a user device to permit a first data processor to access private data associated with the user, the request comprising:
a request for a first data access block relating to the private data; and
a data filter describing one or more access parameters relating to the first data processor and the private data;
generating the first data access block, at the cloud data privacy service, based on the private data and the data filter, comprising:
using an encryption key to digitally sign the first data access block;
transmitting the generated first data access block from the cloud privacy service to the user device, wherein the user device is configured to transmit the first data access block to the first data processor;
receiving, at the cloud data privacy service, a request from the first data processor for the private data, the request comprising the first data access block; and
determining, at the cloud data privacy service, that the first data access block received from first data processor is valid by validating the digital signature for the first data access block, and in response granting the first data processor at least partial access to the private data.

13. The system of claim 12, wherein a scope of the at least partial access to the private data granted to the first data processor is based on the first data access block.

14. The system of claim 12, the operation further comprising:
determining, at the cloud data privacy service, based on the first data access block received from first data processor, that the data filter specifies user approval prior to granting the first data processor access to the private data, and in response:
transmitting from the cloud data privacy service to the user device a request for approval; and
receiving, at the cloud data privacy service from the user device, a message indicating approval.

15. The system of claim 12, the operation further comprising:
providing, by the first data processor to a second data processor, access to at least a portion of the private data, comprising:
generating, at the cloud data privacy service based on the first data access block, a second data access block relating to a second data processor;
transmitting, from the cloud data privacy service to the first data processor, the second data access block, wherein the first data processor is configured to provide the second data access block to the second data processor;
receiving, at the cloud data privacy service from the second data processor, a request to access the at least the portion of the private data, the request comprising the second data access block; and
determining, at the cloud data privacy service, that the second data access block received from second data processor is valid, and in response granting the second data processor at least partial access to the at least the portion of the private data.

16. A non-transitory computer program product, the computer program product comprising:
a computer-readable storage medium having computer-readable program code embodied therewith, the computer-readable program code executable by one or more computer processors to perform an operation, the operation comprising:
receiving, at a cloud data privacy service, a request from a user device to permit a first data processor to access private data associated with the user, the request comprising:
a request for a first data access block relating to the private data; and
a data filter describing one or more access parameters relating to the first data processor and the private data;
generating the first data access block, at the cloud data privacy service, based on the private data and the data filter, comprising:
using an encryption key to digitally sign the first data access block;
transmitting the generated first data access block from the cloud privacy service to the user device, wherein the user device is configured to transmit the first data access block to the first data processor;
receiving, at the cloud data privacy service, a request from the first data processor for the private data, the request comprising the first data access block; and
determining, at the cloud data privacy service, that the first data access block received from first data processor is valid by validating the digital signature for the first data access block, and in response granting the first data processor at least partial access to the private data.

17. The computer program product of claim 16, wherein a scope of the at least partial access to the private data granted to the first data processor is based on the first data access block.

18. The computer program product of claim 16, the operation further comprising:
determining, at the cloud data privacy service, based on the first data access block received from first data processor, that the data filter specifies user approval prior to granting the first data processor access to the private data, and in response:
transmitting from the cloud data privacy service to the user device a request for approval; and
receiving, at the cloud data privacy service from the user device, a message indicating approval.

19. The computer program product of claim 16, the operation further comprising:
- providing, by the first data processor to a second data processor, access to at least a portion of the private data, comprising:
  - generating, at the cloud data privacy service based on the first data access block, a second data access block relating to a second data processor;
  - transmitting, from the cloud data privacy service to the first data processor, the second data access block, wherein the first data processor is configured to provide the second data access block to the second data processor;
  - receiving, at the cloud data privacy service from the second data processor, a request to access the at least the portion of the private data, the request comprising the second data access block; and
- determining, at the cloud data privacy service, that the second data access block received from second data processor is valid, and in response granting the second data processor at least partial access to the at least the portion of the private data.

* * * * *